United States Patent Office 3,589,948
Patented June 29, 1971

3,589,948
METHOD OF CONSTRUCTING BATTERY INTERCELL CONNECTORS THROUGH THE PARTITION
William D. Adams, Toronto, Ontario, Canada, assignor to ESB Incorporated
Filed May 14, 1968, Ser. No. 729,088
Int. Cl. H01m 35/10
U.S. Cl. 136—134                           6 Claims

ABSTRACT OF THE DISCLOSURE

The tops of risers extending upward on both sides of the container partition from the connecting straps are melted. The molten riser material flows into a hole in the partition where it is chilled to produce an intercell connector. Melting is done by any suitable energy source, such as electrical induction, heat conduction, passing a current through the risers sufficient to melt the riser material, or with a torch flame.

CROSS-REFERENCE TO RELATED APPLICATIONS

This application is related to one filed on June 5, 1967 by Charles J. Lund entitled "Method for Casting Battery Intercell Connectors," Ser. No. 643,702, now abandoned, which application is owned by the assignee of this application.

BACKGROUND OF THE INVENTION

It is well recognized to be advantageous to construct the intercell connectors of multicell batteries through the partitions of the battery container. The advantages in comparison with going over the tops of the partitions or through individual cell covers include reduced quantities of materials and a lower internal electrical resistance, both advantages being the result of a shorter path.

With the exception of the Lund application mentioned above, the previous methods of constructing intercell connectors through a partition hole have required that one or more precast projections be inserted horizontally into the partition hole. These precast projections could be separate from but supported by both vertical risers, or could be horizontal extensions of one or both risers. All of these constructions are illustrated, for example, in U.S. Pat. No. 3,313,658, issued to A. Sabatino et al. on Apr. 11, 1967. See also U.S. Pat. No. 3,336,164, issued to J. H. Miller on Aug. 15, 1967 (horizontal projections extend into the partition hole from one or both vertical risers) and U.S. Pat. No. 3,275,793, issued to R. Frischkorn et al. on Sept. 27, 1966 (horizontal projections extend into the partition hole from both vertical risers). These horizontal connections must be joined to each other or to the risers to create a good electrical connection, and must also be constructed so as to prevent intercell leakage of electrolyte. To achieve these results, numerous combinations of time, heat, pressure, and electrical current are used together with special configurations in the horizontal projections. One of the disadvantages of these prior methods is that the precast horizontal projections must be properly inserted into the partition hole, which introduces a requirement of care by workers as well as the possibility of damage to the partition. Where an electrical current is to be passed through these horizontal projections, the projections must make contact with each other or with the risers to ensure a closed electrical circuit, and so this becomes a prerequisite for successful construction.

These problems are overcome by the method disclosed in the Lund application, in which the partition hole is surrounded by molds which extend down and rest on the connecting straps below. Molten lead is introduced into the mold cavities to a height such that the lead extends through the partition hole and then solidifies. Alternatively, granulated or powdered lead may be introduced and melted inside the molds. Both the vertical risers and the horizontal portion of the intercell connector extending through the partition hole are thus constructed simultaneously. The Lund method thus requires a charge of molten or powdered lead to be introduced into the molds after the molds are in place; in either event, transportation of the lead to the molds is involved. Also, where the Lund method is used by introducing molten lead into the molds, two of the three joints produced are between molten lead and the room temperature connecting straps; such hot-to-cold fusion has some tendency to produce unsatisfactory joints as well as non-uniform results.

SUMMARY OF THE INVENTION

In this invention precast risers extend vertically upward from the connecting straps to surround both sides of the partition hole. Horizontal portions which project from, or are supported by, these risers into the partition hole are no longer necessary. Molds are placed around the tops of the risers and the riser tops are then melted until the molten riser material has flowed into the partition hole and fused the two risers together. Melting may be done by electrical induction, heat conduction, passing a current through the risers sufficient to melt the riser material, or with a torch flame, to name several specific melting methods.

The present method retains the advantages of the Lund method by avoiding the necessity to insert precast horizontal portions into the partition hole and later join them together, but differs from the Lund method by not requiring molten or powdered metal to be introduced into the molds after they are placed around the partition hole. This represents an improvement over the Lund method since transportation of the molten or powdered metal is thus avoided. The two hot-to-cold fusions required when molten lead is introduced into the molds using the Lund method are also avoided. With this invention the risers may be, and preferably are, cast simultaneously and integrally with the connecting straps.

DESCRIPTION OF THE PREFERRED EMBODIMENT

Before beginning a discussion of the method which is the subject of this application, it will be helpful to give a brief description of a typical battery in which the method is to be performed. A multicell battery such as the familiar automotive battery includes a container having partitions which divide the space inside into cell compartments. Inside each cell compartment is a series of negative and positive plates, alternatively spaced and separated from one another by suitable separators. Extending across the compartments and electrically connecting all positive plates with one another and all negative plates with one another are positive and negative connecting straps, respectively. Collectively the plates, separators, and connecting straps constitute cell elements. The familiar lead-acid automotive battery today typically has six such cells, and these cells must be electrically connected together in series.

Figure 1:
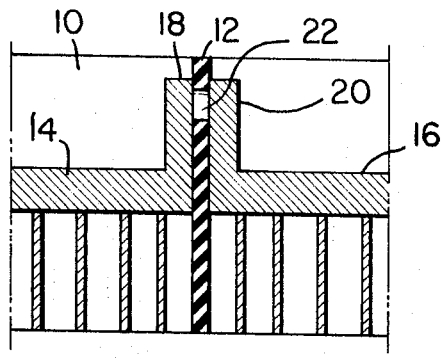
FIG. 1 is a schematic view of the vertical risers projecting upwardly from the connecting straps to surround both sides of the partition hole.

FIG. 1 briefly illustrates a portion of this construction. A container 10 is divided by a partition 12 into cell compartments into which cell elements have been placed. In one cell compartment is shown the negative connecting strap 14 while in the adjoining cell compartment the positive connecting strap 16 is shown. Projecting upwardly from the connecting straps 14 and 16 are vertical risers 18 and 20, respectively, which surround both sides of a hole 22 in the partition. It is to be understood that the risers may be joined to the connecting straps in any convenient manner; that is, they may be integrally cast with the straps, burned or welded onto the straps, etc. Note that no horizontal portions project from, or are supported by, these risers into the partition hole.

In general, with this invention the risers are surrounded by molds following which the tops of the risers are melted. The molten riser material flows into the partition hole where it chills and produces an intercell connector. While any convenient energy source capable of melting the riser tops may be used, several specific energy sources have been shown experimentally to be feasible.

Figure 2:
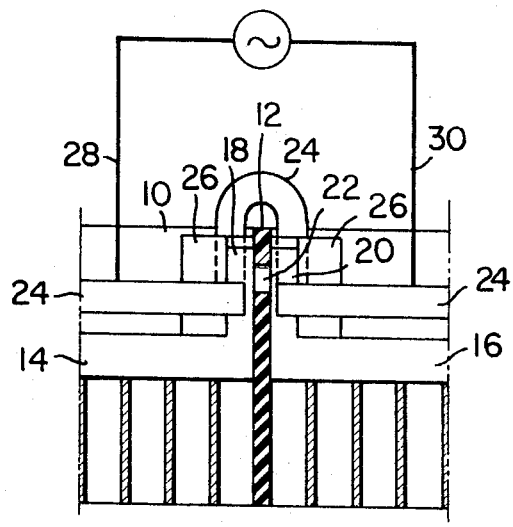
FIG. 2 is a schematic view showing molds surrounding the risers and an induction coil surrounding the molds.
Figure 3:
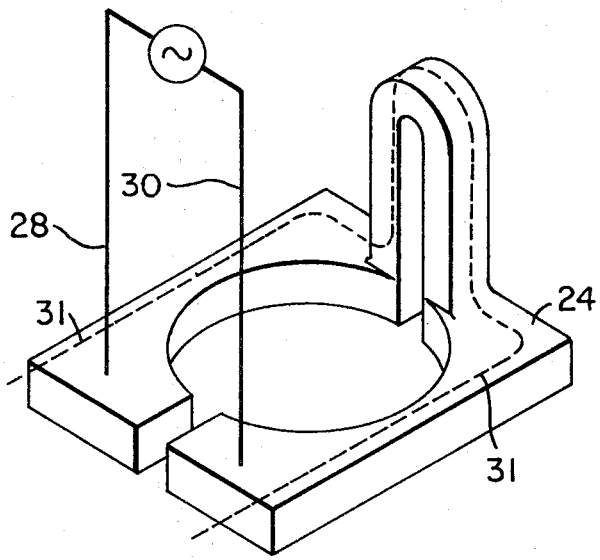
FIG. 3 shows one configuration of a suitable induction coil.

One energy source known to be feasible is an induction coil 24 which may be in or around the molds 26, the latter being illustrated schematically in FIG. 2. One configuration of the coil appears in FIG. 3, which also shows a dashed line 31 representing the path of a conduit used to circulate a coolant for the coil. The material from which the molds 26 are made must be heat resistant and have suitable mechanical characteristics. Molds made from flexible, silicone polymer with an outer shell of stiff vulcanized fiber are suitable. Among the factors influencing the time and power requirements of the method when this energy source is used are the magnitude and frequency of the electrical current, along with the size and thermal and electrical properties of the risers, molds, and induction coil. Considerable variation in coil design and electrical current selection is possible, with optimum results being achieved by designing coils and currents for specific applications.

Another approach to melting the tops of the risers is to place a pair of electrodes in contact with the riser tops and then pass electrical currents through the electrodes. Such an approach is illustrated schematically in FIG. 4, where a pair of current conducting wires 28 and 30 are shown leading from each electrode 32. With this approach the electrical currents pass through the electrodes but not through the molds or risers. The magnitudes of the electrical currents and the electrode resistances should be such as to heat the electrodes to temperatures above the melting point of the riser material, with the electrodes supplying heat to the risers by conduction. The electrodes in this case function in principle in the same fashion as common soldering irons. The magnitude of the electrical current and the electrode resistance are among the chief variables influencing the time required to melt the riser tops.

Figure 5:
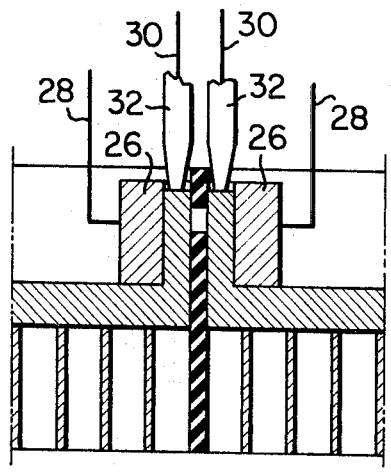
FIG. 5 is a schematic view showing molds surrounding the risers and also showing electrodes in contact with riser tops and wires for conducting an electric current between the electrodes and the molds.
Figure 4:
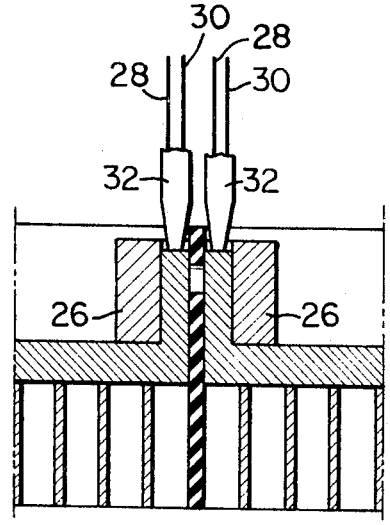
FIG. 4 is a schematic view showing molds surrounding the risers and also showing electrically heated electrodes in contact with the riser tops and supplying heat to the risers by conduction.

The conducting wires 28 and 30 of FIG. 4 may be arranged somewhat differently so that the electrical current flows between the electrodes 32 and the electrically conductive molds 26, as shown in FIG. 5. With this approach the current also would flow through the risers. As with the arrangement shown in FIG. 4, this approach might cause the electrodes to rise to a temperature above the melting point of the riser material, and in this manner so produce melting by heat conduction. In addition or as an alternative, the magnitude of the electrical currents and the riser resistances might also be such as to melt the riser material. It is entirely possible that melting would be produced by a combination of these two events, since they may occur simultaneously.

Figure 6:
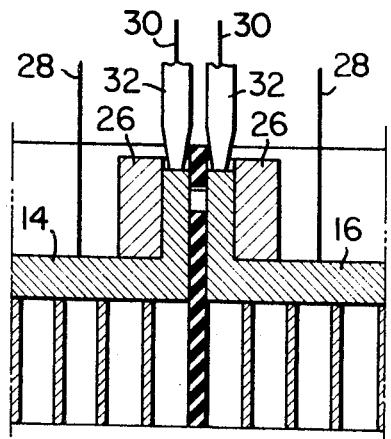
FIG. 6 is a schematic view showing molds surrounding the risers and also showing electrodes in contact with the riser tops and wires for conducting an electric current between the electrodes and the connecting straps.

Similar to the approach illustrated in FIG. 5 is that shown in FIG. 6, the difference being that in FIG. 6 the current flows between the electrodes 32 and the connecting straps 14 and 16. Again, melting might be caused by heat conduction from the electrodes to the risers and/or by heat produced within the risers as a result of the magnitude of electrical current and riser resistance.

Figure 7:
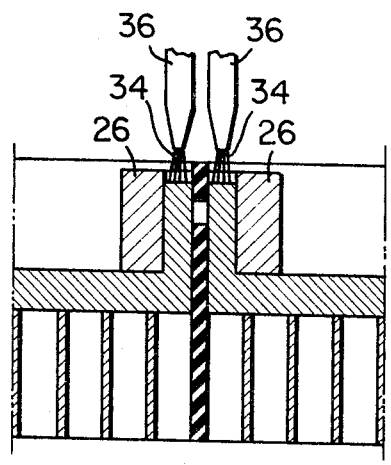
FIG. 7 is a schematic view showing molds surrounding the risers and also showing gas torches above the risers having flames extending downward toward the risers.

In FIG. 7 the melting is shown to be caused by flames 34 coming from gas torches 36.

A few comments applicable to several of the figures should be made. First, where the electrodes of FIGS. 4, 5, or 6 are used or where the gas torches of FIG. 7 are employed to produce melting it may be necessary or desirable to place a heat-insulating shield in the shape of an inverted U over the top of the partition to prevent the partition from melting. Where electrodes are placed in contact with the top of the risers, FIG. 4 through 6, melting may be speeded up by having a high initial resistance to the current, and this can be achieved by using configurations in the ends of the electrodes and risers which produce a point-to-surface or line-to-surface contact between the electrodes and risers (similar ideas are discussed in the Sabatino and Frischkorn patents cited above with respect to the configurations of the precast horizontal portions which extend through the partion hole and must be welded together). Also, in order to get good electrical contact between the electrodes and the riser tops it is desirable to have the riser tops clean before the electrodes are brought in contact. Finally, if the multicell battery requires that two or more intercell connectors be constructed, a head containing an appropriate number of energy sources may be placed on the battery and all of the intercell connectors may be constructed simultaneously.

I claim:

1. In a partially constructed battery having a container in which a partition divides the space inside into two compartments and in which there is an assembled element in each compartment and a hole in the partition, the elements being further described as having vertical risers projecting upwardly from the connecting straps to surround both sides of the partition hole, the method for constructing intercell connectors through the partition hole which comprises:

(a) surrounding both of the risers with molds;
(b) melting the tops of the risers surrounded by the mold until the molten riser material has flowed into the partition hole and fused the two risers, the melting being done by passing electric current through an induction coil surrounding the risers;
(c) chilling the molten riser material until it solidifies; and,
(d) removing the mold from the battery.

2. The method of claim 1 in which the induction coil surrounds the molds.

3. The method of claim 1 in which the induction coil is in the molds.

4. In a partially constructed battery having a container in which a partition divides the space inside into two compartments and in which there is an assembled element in each compartment and a hole in the partition, the elements being further described as having vertical risers projecting upwardly from the connecting straps to surround both sides of the partition hole, the method for constructing intercell connectors through the partition hole which comprises:

(a) surrounding both of the risers with molds;

(b) melting the tops of the risers surrounded by the molds until the molten riser material has flowed into the partition hole and fused the two risers, the melting being done by passing electric currents through electrodes in contact with the tops of the risers;

(c) chilling the molten riser material until it solidifies; and, (d) removing the mold from the battery.

5. The method of claim 4 in which the electric currents pass between the electrodes and the molds.

6. The method of claim 4 in which the electric currents pass between the electrodes and the connecting straps.

References Cited

UNITED STATES PATENTS

| | | | |
|---|---|---|---|
| 1,882,414 | 10/1932 | Ford | 136—134 |
| 2,066,691 | 1/1937 | Lormor | 136—176X |
| 2,221,542 | 11/1940 | Hopkins | 136—134UX |
| 3,259,525 | 7/1966 | Wilson | 136—134X |

DONALD L. WALTON, Primary Examiner

U.S. Cl. X.R.

136—176; 219—85, 234